US009106150B2

(12) United States Patent
Chiang et al.

(10) Patent No.: US 9,106,150 B2
(45) Date of Patent: Aug. 11, 2015

(54) BATTERY FREE OFF-GRID SOLAR INVERTER SYSTEM AND CONTROL METHOD THEREOF

(71) Applicant: DARFON ELECTRONICS CORP., Taoyuan (TW)

(72) Inventors: Chang-Chia Chiang, Taoyuan (TW); Li Hsiang, Taoyuan (TW); Hsiao-Chih Ku, Taoyuan (TW)

(73) Assignee: DARFON ELECTRONICS CORP., Gueishan, Taoyuan (TW)

( * ) Notice: Subject to any disclaimer, the term of this patent is extended or adjusted under 35 U.S.C. 154(b) by 397 days.

(21) Appl. No.: 13/688,228

(22) Filed: Nov. 29, 2012

(65) Prior Publication Data
US 2013/0141956 A1 Jun. 6, 2013

(30) Foreign Application Priority Data
Dec. 2, 2011 (TW) .............................. 100144350 A

(51) Int. Cl.
*H02M 1/36* (2007.01)
*H02M 7/42* (2006.01)
*H02J 3/38* (2006.01)

(52) U.S. Cl.
CPC ................. *H02M 7/42* (2013.01); *H02J 3/385* (2013.01); *Y02E 10/58* (2013.01)

(58) Field of Classification Search
USPC ................................. 323/906; 363/49, 95, 131
See application file for complete search history.

(56) References Cited

U.S. PATENT DOCUMENTS

| 4,390,940 | A  * | 6/1983  | Corbefin et al. ............... 363/132 |
|-----------|------|---------|----------------------------------------|
| 5,898,585 | A  * | 4/1999  | Sirichote et al. ............... 363/132 |
| 7,672,149 | B2 * | 3/2010  | Falk ................................. 363/98 |
| 7,986,539 | B2   | 7/2011  | Fornage                                |
| 8,462,526 | B2 * | 6/2013  | Mabuchi et al. ............... 363/124  |
| 8,482,936 | B2 * | 7/2013  | Falk et al. ......................... 363/17 |
| 8,503,200 | B2 * | 8/2013  | Chapman et al. ............... 363/41   |
| 8,599,586 | B2 * | 12/2013 | El-Barbari et al. ............. 363/49  |
| 8,699,237 | B2 * | 4/2014  | Pan et al. ......................... 363/17 |
| 8,908,404 | B2 * | 12/2014 | Itako ................................. 363/95 |
| 2011/0089886 | A1 |  4/2011 | Dubovsky                             |
| 2013/0141956 | A1* | 6/2013  | Chiang et al. ................... 363/95 |
| 2013/0201736 | A1* | 8/2013  | Chiang et al. ................... 363/71 |
| 2013/0201737 | A1* | 8/2013  | Chiang et al. ................... 363/72 |

FOREIGN PATENT DOCUMENTS

JP       9179643 A     7/1997
TW       M380576       5/2010
(Continued)

*Primary Examiner* — Jeffrey Sterrett
(74) *Attorney, Agent, or Firm* — Winston Hsu; Scott Margo

(57) ABSTRACT

A battery free off-grid solar inverter system includes an inverter and a controller. The inverter is used for converting a direct current voltage provided by a solar panel into an alternating current voltage. The inverter has an input terminal, an output terminal, and a control terminal. The input terminal is used for coupling to the solar panel for receiving the direct current voltage, and the output terminal is used for coupling to a load for coupling the alternating current voltage. The controller is coupled to the control terminal for gradually increasing the alternating current voltage to make the direct current voltage be gradually decreased when the battery free off-grid solar inverter system is turned on. The controller stops increasing the alternating current voltage when the direct current voltage is lower than a predetermined direct current voltage value.

3 Claims, 4 Drawing Sheets

(56) References Cited

FOREIGN PATENT DOCUMENTS

| TW | 201030490 | 8/2010 |
| TW | 201107925 | 3/2011 |
| TW | 201116966 | 5/2011 |
| TW | M415206 | 11/2011 |

\* cited by examiner

BATTERY FREE OFF-GRID SOLAR INVERTER SYSTEM AND CONTROL METHOD THEREOF

BACKGROUND OF THE INVENTION

1. Field of the Invention

The present invention relates to a battery free off-grid solar inverter system and a control method thereof, and particularly to a battery free off-grid solar inverter system and a control method thereof that can utilize a controller to control operation of an inverter coupled to a solar panel.

2. Description of the Prior Art

Please refer to FIG. 1. FIG. 1 is a diagram illustrating a solar inverter system 100 according to the prior art. As shown in FIG. 1, an inverter 104 is coupled to a solar panel 102 and a battery 106, where the battery 106 is used for storing power. When power generated by the solar panel 102 can not satisfy power consumed by a load 108, a controller 110 can control the battery 106 to release stored power to satisfy the power consumed by the load 108 and maintain the inverter 104 to operate continuously. That is to say, the inverter 104 can not be turned off when power generated by the solar panel 102 can not satisfy power consumed by a load 108.

For lower cost sake, the solar inverter system may be requested to be battery free. Therefore, how to design a solar inverter system which is battery free and can operate stably is an important issue for a designer of a solar inverter system.

Please refer to U.S. Pat. No. 7,986,539, United States Patent Publication No. 20110089886, and United States Patent Publication No. 20100264869. U.S. Pat. No. 7,986,539, United States Patent Publication No. 20110089886, and United States Patent Publication No. 20100264869 have disclosed some structures and basic principles corresponding to a solar inverter.

SUMMARY OF THE INVENTION

An embodiment provides a battery free off-grid solar inverter system. The battery free off-grid solar inverter system includes an inverter and a controller. The inverter is used for converting a direct current voltage provided by a solar panel into an alternating current voltage. The inverter has an input terminal, an output terminal, and a control terminal, where the input terminal is used for coupling to the solar panel for receiving the direct current voltage, and the output terminal is used for coupling to a load for coupling the alternating current voltage. The controller is coupled to the control terminal for gradually increasing the alternating current voltage to make the direct current voltage be gradually decreased when the battery free off-grid solar inverter system is turned on. The controller stops increasing the alternating current voltage when the direct current voltage is lower than a predetermined direct current voltage value.

Another embodiment provides a control method of a battery free off-grid solar inverter system. The battery free off-grid solar inverter system includes an inverter and a controller. The inverter has an input terminal, an output terminal, and a control terminal, where the input terminal is coupled to a solar panel for receiving a direct current voltage, the output terminal is coupled to a load for outputting an alternating current voltage, and the controller is used for changing the alternating current voltage. The control method includes determining whether the alternating current voltage is lower than an alternating current voltage target value; determining whether the direct current voltage is lower than a predetermined direct current voltage value when the alternating current voltage is lower than the alternating current voltage target value; and executing a corresponding operation according to a determination result.

The present invention provides a battery free off-grid solar inverter system and a control method thereof. The battery free off-grid solar inverter system and the control method utilize a controller to control an inverter to provide an alternating current voltage to a load to make a direct current voltage of an input terminal of the inverter be gradually decreased toward a predetermined direct current voltage value, where the predetermined direct current voltage value is slightly greater than a voltage corresponding to a Maximum Power Point of a solar panel. Therefore, the present invention can reduce cost of the battery free off-grid solar inverter system, ensure that the battery free off-grid solar inverter system can not be suddenly turned off under a battery-free condition, and increase stability of the battery free off-grid solar inverter system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
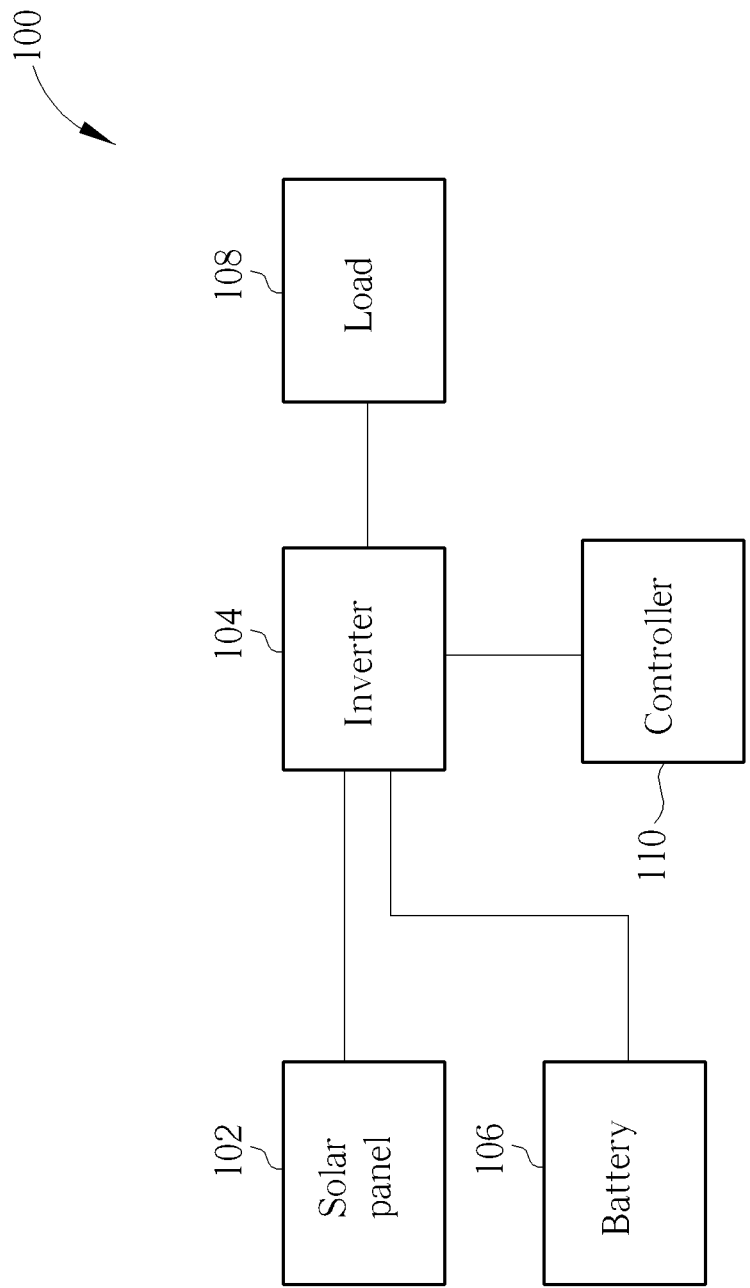
FIG. 1 is a diagram illustrating a solar inverter system according to the prior art.
Figure 2:
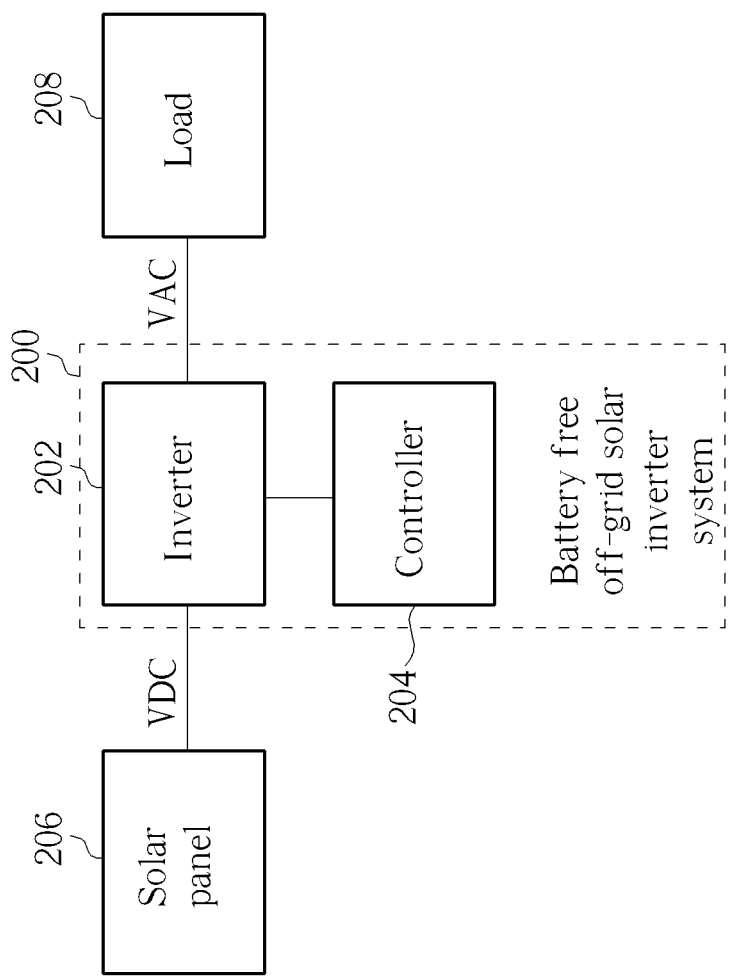
FIG. 2 is a diagram illustrating a battery free off-grid solar inverter system according to an embodiment.
Figure 3:
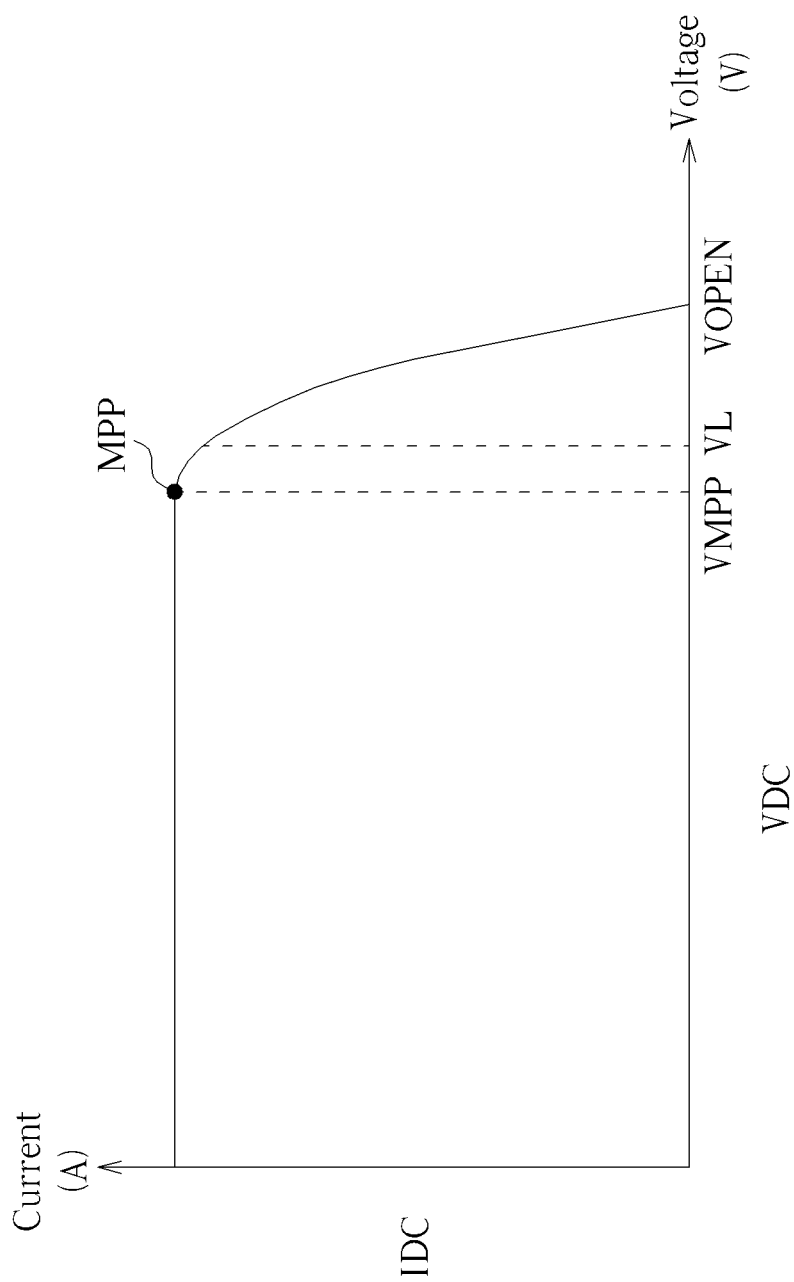
FIG. 3 is a diagram illustrating a relationship between a direct current voltage and a direct current outputted by the battery free off-grid solar inverter system.

Please refer to FIG. 2 and FIG. 3. FIG. 2 is a diagram illustrating a battery free off-grid solar inverter system 200 according to an embodiment, and FIG. 3 is a diagram illustrating a relationship between a direct current voltage VDC and a direct current IDC outputted by the battery free off-grid solar inverter system 200. As shown in FIG. 2 and FIG. 3, the battery free off-grid solar inverter system 200 includes an inverter 202 and a controller 204. The inverter 202 is used for converting the direct current voltage VDC provided by a solar panel 206 into an alternating current voltage VAC. The inverter 202 has an input terminal, an output terminal, and a control terminal, where the input terminal of the inverter 202 is used for coupling to the solar panel 206 for receiving the direct current voltage VDC, and the output terminal of the inverter 202 is used for coupling to a load 208 for outputting the alternating current voltage VAC. The controller 204 is coupled to the control terminal of the inverter 202 for gradually increasing the alternating current voltage VAC to make the direct current voltage be gradually decreased from an open-circuited voltage VOPEN (e.g. 50V) of the solar panel 206 when the battery free off-grid solar inverter system 200 is turned on. The controller 204 stops increasing the alternating current voltage VAC when the direct current voltage VDC is lower than a predetermined direct current voltage value VL (e.g. 40V). A voltage VMPP corresponding to a Maximum Power Point (MPP) of the solar panel 206 is usually 0.75 times the open-circuited voltage VOPEN of the solar panel 206. The predetermined direct current voltage value VL is set to 0.75-0.8 times the open-circuited voltage VOPEN. That is to say, the predetermined direct current voltage value VL is slightly greater than the voltage VMPP corresponding to the Maximum Power Point (MPP) of the solar panel 206.

As shown in FIG. 2 and FIG. 3, when the battery free off-grid solar inverter system 200 is turned on, the controller 204 starts to gradually increase the alternating current voltage VAC provided to the load 208 by the inverter 202 from an predetermined alternating current voltage value (e.g. 20V), and an increment of the alternating current voltage VAC provided to the load 208 by the inverter 202 is 0.3V per time, where the increment is controlled by the controller 204. But, the present invention is not limited to the controller 204 starting to gradually increase the alternating current voltage VAC provided to the load 208 by the inverter 202 from 20V, and is also not limited to the increment of the alternating current voltage VAC provided to the load 208 by the inverter 202 being 0.3V per time. As shown in FIG. 3, because the alternating current voltage VAC of the output terminal of the inverter 202 controlled by the controller 204 is gradually increased, the direct current voltage VDC of the input terminal of the inverter 202 is gradually decreased toward the predetermined direct current voltage value VL. When the direct current voltage VDC is greater than the predetermined direct current voltage value VL, the controller 204 can keep controlling the inverter 202 to increase the alternating current voltage VAC provided to the load 208; when the direct current voltage VDC is lower than the predetermined direct current voltage value VL, the controller 204 can control the inverter 202 to stop increasing the alternating current voltage VAC provided to the load 208, and the controller 204 can make the inverter 202 output a previous or a previous two value of the alternating current voltage VAC. For example, if the increment of the alternating current voltage VAC is set to 0.3V per time and the predetermined direct current voltage value VL is set to 40V, the controller 204 detects the direct current voltage VDC to be lower than the predetermined direct current voltage value VL (40V) when the alternating current voltage VAC is increased to 200.3V, so the controller 204 makes the output terminal of the inverter 202 output a previous value (200V) of the alternating current voltage VAC or a previous two value (199.7V) of the alternating current voltage. Therefore, the above mentioned control method can limit output power of the inverter 202 to prevent the output power of the inverter 202 from suddenly exceeding input power of the inverter 202 to avoid turning-off of the inverter 202.

In addition, when power provided by the solar panel 206 within a period of time (e.g. 3 seconds) can not satisfy power consumed by the load 108, the direct current voltage VDC is decreased to a predetermined value (e.g. 18V). Meanwhile, the controller 204 can turn off the inverter 202, and turn on the inverter 202 again after a predetermined time (e.g. 1 minute).

Figure 4:
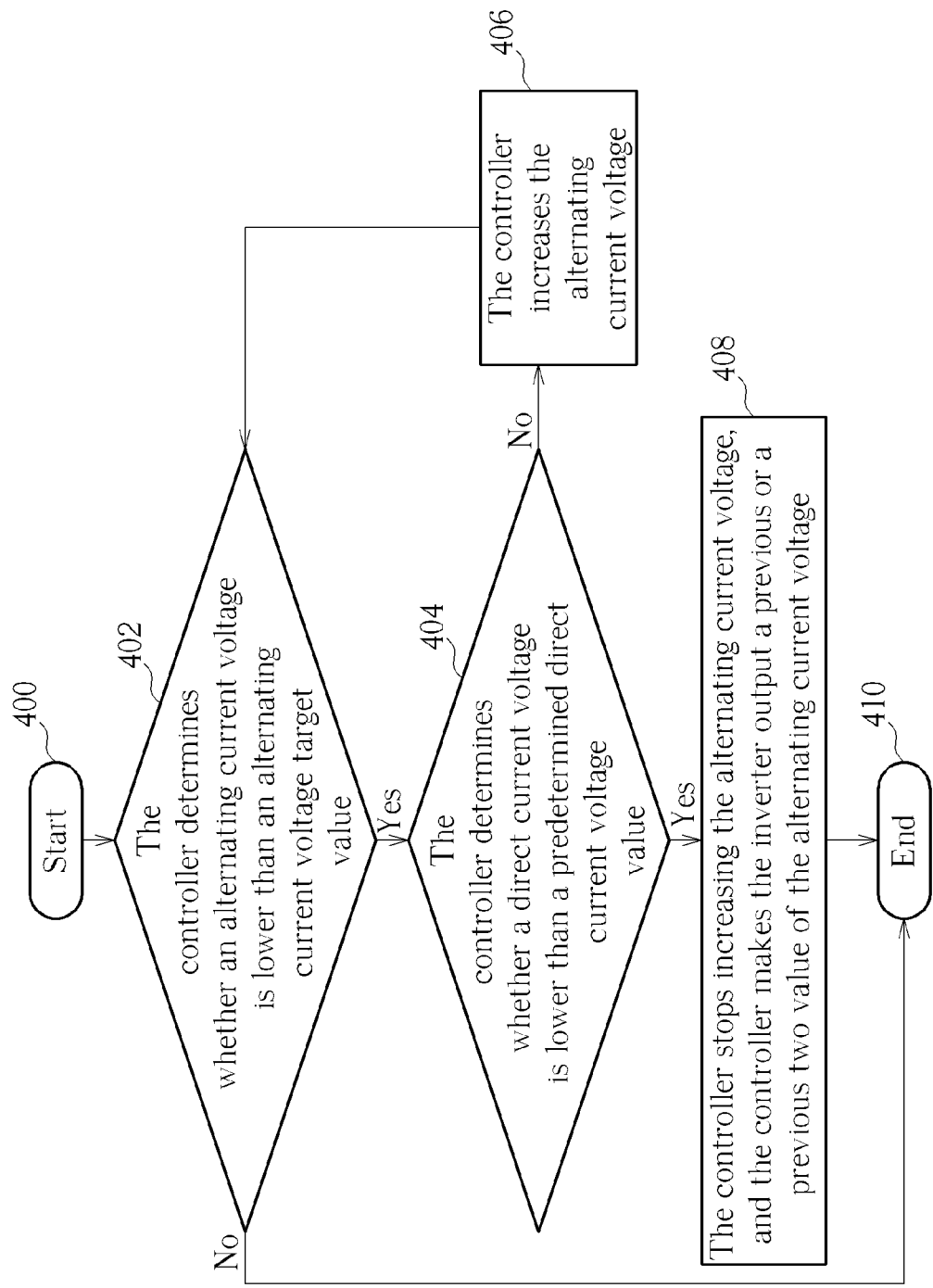
FIG. 4 is a flowchart illustrating a control method of a battery free off-grid solar inverter system according to another embodiment.

Please refer to FIG. 4, FIG. 2, and FIG. 3. FIG. 4 is a flowchart illustrating a control method of a battery free off-grid solar inverter system according to another embodiment. The method in FIG. 4 is illustrated using the battery free off-grid solar inverter system 200 in FIG. 2. Detailed steps are as follows:

Step 400: Start.

Step 402: The controller 204 determines whether an alternating current voltage VAC is lower than an alternating current voltage target value VT; if yes, go to Step 404; if no go to Step 410.

Step 404: The controller 204 determines whether a direct current voltage VDC is lower than a predetermined direct current voltage value VL; if yes, go to Step 408; if no go to Step 406.

Step 406: The controller 204 increases the alternating current voltage VAC; go to Step 402.

Step 408: The controller 204 stops increasing the alternating current voltage VAC, and the controller 204 makes the inverter 202 output a previous or a previous two value of the alternating current voltage VAC.

Step 410: End.

In Step 402, the alternating current voltage target value VT can be first set to 110V or 220V according to a specification of the load 208. In Step 406, the controller 204 starts to gradually increase the alternating current voltage VAC from a predetermined alternating current voltage value (e.g. 20V), and an increment of the alternating current voltage VAC can be set to 0.3V-0.8V per time. As shown in FIG. 3, when the alternating current voltage VAC of the output terminal of the inverter 202 is gradually increased, the direct current voltage VDC of the input terminal of the inverter 202 is gradually decreased toward the predetermined direct current voltage value VL. In Step 404, when the direct current voltage VDC is lower than the predetermined direct current voltage value VL, go to Step 408. Meanwhile, the controller 204 can control the inverter 202 to stop increasing the alternating current voltage VAC, and the controller 204 can make the inverter 202 output the previous or the previous two value of the alternating current voltage VAC. For example, if the predetermined direct current voltage value VL is set to 40V and the increment of the alternating current voltage VAC is set to 0.3V per time, when the alternating current voltage VAC is increased to 200.3V, and the controller 204 detects the direct current voltage VDC to be 39.5V, because the direct current voltage VDC (39.5V) is lower than the predetermined direct current voltage value VL (40V), go to Step 408. That is to say, the controller 204 controls the inverter 202 to stop increasing the alternating current voltage VAC, and makes the inverter 202 output a previous value (200V) of the alternating current voltage VAC or a previous two value (199.7V) of the alternating current voltage.

To sum up, the battery free off-grid solar inverter system and the control method thereof utilize the controller to control the inverter to provide an alternating current voltage to the load to make a direct current voltage of the input terminal of the inverter be gradually decreased toward a predetermined direct current voltage value, where the predetermined direct current voltage value is slightly greater than the voltage corresponding to the Maximum Power Point of the solar panel. Therefore, the present invention can reduce cost of the battery free off-grid solar inverter system, ensure that the battery free off-grid solar inverter system can not be suddenly turned off under a battery-free condition, and increase stability of the battery free off-grid solar inverter system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery free off-grid solar inverter system, the battery free off-grid solar inverter system comprising:

an inverter for converting a direct current voltage provided by a solar panel into an alternating current voltage, the inverter having an input terminal, an output terminal, and a control terminal, wherein the input terminal is used for coupling to the solar panel for receiving the direct current voltage, and the output terminal is used for coupling to a load for outputting the alternating current voltage; and a controller coupled to the control terminal for gradually increasing the alternating current voltage to make the direct current voltage be gradually decreased when the battery free off-grid solar inverter system is turned on, wherein the controller stops increasing the alternating current voltage when the direct current voltage is lower than a predetermined direct current voltage value.

2. The battery free off-grid solar inverter system of claim 1, wherein the predetermined direct current voltage value is 0.75-0.8 times an open-circuited voltage of the solar panel.

3. The battery free off-grid solar inverter system of claim 1, wherein when the direct current voltage is lower than a predetermined value, the controller turns off the inverter.

* * * * *